United States Patent
Rudkin et al.

(10) Patent No.: US 7,707,271 B2
(45) Date of Patent: Apr. 27, 2010

(54) DELIVERING PERSONALIZED CONTENT DATA VIA LOCAL NETWORK

(75) Inventors: Steven Rudkin, Ipswich (GB); Michael Rizzo, Ipswich (GB); Andrew R Carver, Oxford (GB)

(73) Assignee: British Telecommunications plc, London (GB)

(*) Notice: Subject to any disclaimer, the term of this patent is extended or adjusted under 35 U.S.C. 154(b) by 1181 days.

(21) Appl. No.: 10/474,901

(22) PCT Filed: Apr. 19, 2002

(86) PCT No.: PCT/GB02/01824

§ 371 (c)(1),
(2), (4) Date: Oct. 16, 2003

(87) PCT Pub. No.: WO02/087193

PCT Pub. Date: Oct. 31, 2002

(65) Prior Publication Data

US 2004/0117426 A1    Jun. 17, 2004

(30) Foreign Application Priority Data

Apr. 19, 2001    (EP) ................... 01303599

(51) Int. Cl.
*G06F 15/16* (2006.01)
*G06F 15/173* (2006.01)
*H04L 12/56* (2006.01)

(52) U.S. Cl. .................. 709/218; 709/223; 709/229; 709/230; 709/238; 709/249; 370/401; 370/901; 370/908

(58) Field of Classification Search ......... 709/200–233, 709/249; 370/401, 901, 908
See application file for complete search history.

(56) References Cited

U.S. PATENT DOCUMENTS

| 5,367,523 A | 11/1994 | Chang et al. |
| 5,408,465 A | 4/1995 | Gusella et al. |
| 5,446,730 A | 8/1995 | Lee et al. |
| 5,600,638 A * | 2/1997 | Bertin et al. ............. 370/351 |

(Continued)

FOREIGN PATENT DOCUMENTS

EP    0 848 560    6/1998

(Continued)

OTHER PUBLICATIONS

G. MacLarty & M. Fry, Policy-based content delivery: an active network approach, 2001, Elsevier Science B.V. pp. 241-248.*

(Continued)

*Primary Examiner*—Saleh Najjar
*Assistant Examiner*—Farzana Huq
(74) *Attorney, Agent, or Firm*—Nixon & Vanderhye PC (57) ABSTRACT

Personalized content is provided over a communications network such as the Internet. Providing personalized content includes both generating content which depends on the recipient of that content and delivering that content in a manner that depends on the recipient. Although methods of providing personalized content are known, none of those methods provide a mechanism for deciding when and how to personalize content. By enabling a content provided to send policy data to local caches and having a local agent computer arrange for content files to be delivered in accordance with those policy files, such a mechanism is provided.

12 Claims, 6 Drawing Sheets

U.S. PATENT DOCUMENTS

| | | | |
|---|---|---|---|
| 5,680,389 | A | 10/1997 | Douglas et al. |
| 5,809,078 | A | 9/1998 | Tani et al. |
| 5,875,175 | A | 2/1999 | Sherer et al. |
| 5,917,822 | A | 6/1999 | Lyles et al. |
| 5,991,306 | A * | 11/1999 | Burns et al. ............... 370/429 |
| 5,991,810 | A * | 11/1999 | Shapiro et al. ............. 709/229 |
| 5,995,606 | A | 11/1999 | Civanlar et al. |
| 6,029,203 | A * | 2/2000 | Bhatia et al. ............... 709/244 |
| 6,041,039 | A | 3/2000 | Kikki et al. |
| 6,073,175 | A * | 6/2000 | Tavs et al. ................. 709/226 |
| 6,078,919 | A * | 6/2000 | Ginzburg et al. ............. 707/10 |
| 6,104,720 | A | 8/2000 | Kisor |
| 6,108,307 | A | 8/2000 | McConnell et al. |
| 6,144,996 | A * | 11/2000 | Starnes et al. .............. 709/217 |
| 6,154,778 | A * | 11/2000 | Koistinen et al. ........... 709/228 |
| 6,229,788 | B1 | 5/2001 | Graves et al. |
| 6,243,754 | B1 | 6/2001 | Guerin et al. |
| 6,304,544 | B1 | 10/2001 | Pierson et al. |
| 6,345,300 | B1 * | 2/2002 | Bakshi et al. .............. 709/229 |
| 6,374,301 | B1 * | 4/2002 | Melen ...................... 709/232 |
| 6,449,650 | B1 | 9/2002 | Westfall et al. |
| 6,483,805 | B1 | 11/2002 | Davies et al. |
| 6,513,061 | B1 * | 1/2003 | Ebata et al. ................ 709/203 |
| 6,538,989 | B1 | 3/2003 | Carter et al. |
| 6,539,425 | B1 * | 3/2003 | Stevens et al. .............. 709/220 |
| 6,556,998 | B1 | 4/2003 | Mukherjee et al. |
| 6,567,893 | B1 * | 5/2003 | Challenger et al. .......... 711/118 |
| 6,594,246 | B1 | 7/2003 | Jorgensen |
| 6,678,793 | B1 * | 1/2004 | Doyle ........................ 711/133 |
| 6,690,929 | B1 | 2/2004 | Yeh |
| 6,691,148 | B1 * | 2/2004 | Zinky et al. ................. 709/201 |
| 6,725,265 | B1 * | 4/2004 | Challenger et al. .......... 709/226 |
| 6,744,767 | B1 | 6/2004 | Chiu et al. |
| 6,772,214 | B1 * | 8/2004 | McClain et al. ............. 709/229 |
| 6,775,519 | B1 | 8/2004 | Wiederman et al. |
| 6,801,501 | B1 | 10/2004 | Knightly et al. |
| 6,816,456 | B1 | 11/2004 | Tse-Au |
| 6,822,940 | B1 | 11/2004 | Zavalkovsky et al. |
| 6,834,341 | B1 * | 12/2004 | Bahl et al. .................. 713/156 |
| 6,842,783 | B1 * | 1/2005 | Boivie et al. ............... 709/225 |
| 6,859,827 | B2 * | 2/2005 | Banginwar ................. 709/223 |
| 6,944,128 | B2 | 9/2005 | Nichols |
| 6,983,139 | B2 * | 1/2006 | Dowling et al. .......... 455/414.2 |
| 6,999,421 | B1 | 2/2006 | Holzworth et al. |
| 7,085,737 | B2 * | 8/2006 | Dan et al. ..................... 705/27 |
| 7,116,682 | B1 | 10/2006 | Waclawsky et al. |
| 7,209,437 | B1 | 4/2007 | Hodgkinson et al. |
| 7,362,775 | B1 | 4/2008 | Moskowitz |
| 7,412,514 | B2 | 8/2008 | Shuster |
| 7,433,311 | B1 | 10/2008 | Kalyanasundaram et al. |
| 2001/0016822 | A1 * | 8/2001 | Bessette ....................... 705/3 |
| 2001/0027484 | A1 | 10/2001 | Nishi |
| 2002/0013849 | A1 | 1/2002 | Schweitzer et al. |
| 2002/0055906 | A1 | 5/2002 | Katz et al. |
| 2002/0152305 | A1 | 10/2002 | Jackson et al. |
| 2003/0088671 | A1 | 5/2003 | Klinker et al. |
| 2003/0145100 | A1 | 7/2003 | Marchetto et al. |
| 2003/0152039 | A1 | 8/2003 | Roberts |
| 2004/0090914 | A1 | 5/2004 | Briscoe et al. |
| 2004/0192324 | A1 | 9/2004 | Rudkin |
| 2005/0021796 | A1 * | 1/2005 | McClain et al. ............. 709/229 |
| 2006/0149854 | A1 | 7/2006 | Rudkin et al. |
| 2006/0178918 | A1 | 8/2006 | Mikurak |

FOREIGN PATENT DOCUMENTS

| | | |
|---|---|---|
| EP | 0 899 916 A2 | 3/1999 |
| EP | 1 113 629 | 7/2001 |
| GB | 2 311 439 | 9/1997 |
| WO | WO 94/14263 | 6/1994 |
| WO | WO 9824208 A2 * | 6/1998 |
| WO | WO 99/13624 | 3/1999 |
| WO | 99/65184 | 12/1999 |
| WO | 99/65185 | 12/1999 |
| WO | WO 00/13390 | 3/2000 |
| WO | WO 00/14919 | 3/2000 |
| WO | 0022795 A | 4/2000 |
| WO | WO 00/35130 | 6/2000 |
| WO | WO 01/52475 A2 | 7/2001 |

OTHER PUBLICATIONS

Elson et al., "ICAP The internet Content Adaptation Protocol", circa Dec. 2000, http//www.i-cap.org/icap/media/draft-opes-icap-00.1.

U.S. Appl. No. 10/469,786, filed Sep. 4, 2003, Briscoe et al.

U.S. Appl. No. 10/482,911, filed Jan. 6, 2004, Rudkin.

U.S. Appl. No. 10/502,851, filed Jul. 29, 2004, Rudkin et al.

Murphy, J. et al., "Distributed pricing for embedded ATM Networks," Proceedings of the International Teletraffic Congress ITC-14, Antibes, France, Jun. 1994.

S. Jordan and H. Jiang, "Connection establishment in high-speed networks," IEEE Jornal on Selected Areas in Communications, vol. 13, No. 7, p. 1150-1161, Sep. 1995.

J.K. Mackie-Mason and H.R. Varian, "Pricing the Internet," in the Proceedings of the $2^{nd}$ International Conference Telecommunications Systems Modeling, Nashville, Tennessee, Mar. 24-27, 1994, pp. 378-383.

Real Broadcast Network White Paper, 9 pages (Apr. 19, 1999).

Rist, "Feeding the Streaming Media Frenzy," Network Computing article, 10 pages (Dec. 4, 2000).

Patrizio, "Long Commitment or One-Night Stand?," 3 pages (2001).

Digital Island literature entitled "Content Delivery Services: Footprint™ Streaming Solutions," 2 pages (undated).

Cable Datacom News article entitled "Distribution Hub," 2 pages (copyright 1996-2001).

Cable Datacom News article entitled "Cable Data Network Architecture," 2 pages (copyright 1996-2001).

Four pages downloaded from http://www.eeng.dcu.ie/~murphyj/dist-price on Jul. 15, 2002.

Seven pages downloaded from http://www.eeng.dcu.ie/~murphyj/band-price on Jul. 15, 2002.

Office Action dated Mar. 3, 2009 in U.S. Appl. No. 10/502,851.

Office Action dated Jun. 24, 2008 in U.S. Appl. No. 10/502,851.

Office Action dated Sep. 19, 2007 in U.S. Appl. No. 10/502,851.

Office Action dated Nov. 26, 2008 in U.S. Appl. No. 10/482,911.

Office Action dated May 16, 2007 in U.S. Appl. No. 10/469,786.

Office Action dated Mar. 11, 2008 in U.S. Appl. No. 10/469,786.

Office Action dated May 14, 2008 in U.S. Appl. No. 10/469,786.

Office Action dated Sep. 5, 2008 in U.S. Appl. No. 10/469,786.

"Market Managed Multi-Service Internet, Deliverable Pricing Mechanisms Pt II," Jul. 10, 2000, pp. 1-24.

Courcoubetis et al., "An Auction Mechanism for Bandwidth Allocation Over Paths," Dept. of Informatics, Athens University of Economics and Business, 11 pgs., http://nes.aueb.gr/publications/2001.ITC.bandwidthauctions.pdf.

Key et al., "User policies in a network implementing congestion pricing," pp. 1-8 http://citeseer.ist.psu.edu/cache/papers/cs/15319/http:zSzzSzresearch.microsoft.comzSzuserszSzimassoulzSzbos.

Chapter 12 entitled "Economics" of training course possibly given at University of California at Berkeley in Jul. 1995, pp. 291-321.

International Search Report mailed Apr. 25, 2003 in PCT/GB03/00446.

Cheng, "Quality of Services Based on Both Call Admission and Cell Scheduling", Computer Networks and ISDN Systems 29 (1997), pp. 555-567.

Crowcroft et al., "A Rough Comparison of the IETF and ATM Service Models", IEEE Network Nov./Dec. 1995, pp. 11-16.

Bolla et al., "Adaptive Access Control of Multiple Traffic Classes in ATM Networks", GLOBECOM '91, vol. 1, Dec. 1991, pp. 0331-0338.

Floyd et al., "Link-Sharing and Resource Management Models for Packet Networks", IEEE/ACM Transactions on Networking, vol. 3, No. 4, Aug. 1995, pp. 365-386.

O'Neill, "Internetwork Futures", BT Technology Journal, vol. 15, No. 2, Apr. 1997, pp. 226-239.

White, "RSVP and Integrated Services in the Internet: A Tutorial", IEEE Communications Magazine, May 1997.

Cable Television Laboratories, Inc., Data-Over-Cable Service Interface Specifications, Radio Frequency Interface Specification, SP-RF1v1.1-IO3-991105, 1999.

Lai, Gung-Chou et al., "Support QoS in IP over ATM," Computer Communications 22 (1999) 4111-418.

V. Jacobsen et al., IETF Request for Comments 2958, "An Expedited Forwarding PHB,"Jun. 1999, http://www.ietf.org/rfc/rfc2598.tst?number+2598.

S. Blake et al., IETF Request for Comments 2475, "An Architecture for Differentiated Services," Dec. 1998, http:www.ietf.org/rfc/rfc2475.txt?number=2475.

K. Nichols et al., IETF Request for Comments 2474, "Definition of the Differentiated Services Field (DS Field) in the IPv4 and IPv6 Headers," Dec. 1998, http:www.ietf.org/rfc/rfc2474.txt?number=2474.

J. Heinanen et al., ., IETF Request for Comments 2597, "Assured Forwarding PHB Group" Jun. 1999, http:www.ietf.org/rfc/rfc2597.txt?number=2597.

Y. Bernet et al. , A Framework for Use of RSVP with Diff-serv Network, Jun. 1998, http:www.watersprings.org/pub/id/draft-ietf-diffserv-rsvp-00.txt.

R. Braden et al., IETF Request for Comments 1633, "Integrated Services in the Internet Architecture: an Overview," Jun. 1994, http:www.ietf.org/rfc/rfc1633.txt?number=1633.

G. Gross et al., IETF Request for Comments 2364, "PPP Over AAL5,"Jul. 1998, http:www.ietf.org/rfc/rfc2364.txt?number=2364.

IP to ATM Class of Service Phase 1 Design Guide—Cisco document, http://cisco.com/univercd/cc/td/doc/product/software/ios111/cc111/ipatmdg.pdf.

Bottura, G., Charging and Tariffing Functions and Capabilities for MANs, IEEE 92 Network Oper Manage Symp., 1992, pp. 208-218.

D. Simpson, "Internet Service Providers—Anarchy in the UK?," British Telecommunications Engineering Journal, vol. 18, Part 2 Special Aug. 1999 Issue, pp. 92-96.

Shasta 5000 Broadband Service Node, Nortel Networks Product Literature.

"Tarifmodelle gegen Staus auf der Infobahn," Funkshau, No. 8, 1998, pp. 28-30, http://www.funkschau.de/heftarchiv/pdf/1998/fs08/fs9808028.pdf.

D. Estrin et al., "Design Considerations for Usage Accounting and Feedback in Internetworks," Computer Communication Review, vol. 20, Oct. 1990, No. 5.

Feng, et al., "Adaptive Packet Marking for Maintaining End-to-End Throughput in a Differentiated-Services Internet," IEEE/ACM Transactions on Networking, vol. 7, No. 5, Oct. 1999.

Martignoni S. et al., "Extensio of Classical IP over ATM to support Qos of the application level," 0-7803-4982-2/98/$10 1998 IEEE. pp. 492-499, pp. 494-496 figures 1-3 and 7; tables 1 and 2.

Chen, et al., "An Architecture for Noncooperative Qos Provision in Many-switch Systems," Department of Computer Sciences, Purdue University, West Lafayette, IN< pp. 864-872.

* cited by examiner

Figure 1

| User_Name | John W. Smith | | | |
|---|---|---|---|---|
| User_Attributes | User_Age | User_Gender | User_Nationality | User_Occcupation |
| | 35 | male | U.K. | Education |

Figure 2

| Content_Class | User_Age | User_Occupation | Diff-Serv Codepoint |
|---|---|---|---|
| Latest Release Videos | < 30 | Information Technology OR Marketing OR Public Relations | 111000 |
| | < 40 | ANY | 110000 |
| | ANY | ANY | 000000 |

| Content_Class | User_Age | User_Occupation | Preference table | |
|---|---|---|---|---|
| | | | Bandwidth (kb/s) | Utility (pence/s) |
| Latest Release Videos | < 30 | Information Technology OR Marketing OR Public Relations | 400 | 0.4 |
| | | | 300 | 0.3 |
| | | | 200 | 0.2 |
| | < 40 | ANY | 400 | 0.3 |
| | | | 300 | 0.225 |
| | | | 200 | 0.15 |
| | ANY | ANY | 400 | 0.2 |
| | | | 300 | 0.15 |
| | | | 200 | 0.1 |

Figure 7

| Bandwidth (kb/s) | Utility (pence/s) |
|---|---|
| 400 | 0.3 |
| 300 | 0.225 |
| 200 | 0.15 |

Figure 8

DELIVERING PERSONALIZED CONTENT DATA VIA LOCAL NETWORK

This application is the US national phase of international application PCT/GB02/01824 filed 19 Apr. 2002 which designated the U.S.

BACKGROUND

1. Technical Field

Since the first release of the Mosaic Web browser in 1993, use of the Internet to download Web-pages, audio files, video files, software files and the like (hereinafter content files) has grown rapidly.

2. Related Art

The attraction of using the Internet in this way would increase further if the content that was delivered to an individual depended on the identity of that individual—in other words, if the content was personalised. Indeed, content providers have begun to offer their customers personalised content. For example, since 1998, Yahoo! Inc. has offered its customers the chance to choose the content and layout of the Web-page they see when browsing my.yahoo.com.

The Internet comprises a large number of local networks (some being regional/national networks) and backbone networks. Many of the local networks only connect to other local networks, but some are connected to backbone networks which are in turn connected to remote local networks. Because the Internet cannot yet offer fast, reliable delivery of content from a remote network, local network operators often provide caches in their networks which store content files frequently requested by customers of that local network. Customers of that local network who subsequently request that content file receive the file quickly since it only need be delivered over the local network.

Personalised content files are generally not stored in caches because they differ in dependence on which user requested them. However, in late 1999, a number of companies announced that they intended to work together to provide an 'Internet Content Adaptation Protocol' (see http://www.i-cap.org for details). The protocol is intended to be used by a network cache in sending a content file received by (or stored at) that cache to another computer which modifies the content file and returns it to the cache for forwarding onto a user. In this way, a user is provided with some of the benefits of both caching and personalisation.

To date, no company has offered people who browse its web-site a quality of network service that differs in dependence on the identity of the individual who is browsing. However, international patent application WO 98/24208 discloses a data communication system which, in response to a request from a user for remotely stored data, reserves, in a connection-oriented wide area network between that user's access network and the remote store, an amount of bandwidth for transferring that file in accordance with a user's level of subscription to the relevant content provider and differential delivery service provider. The reservation only takes place if the amount of bandwidth is suitable for the type of data concerned and if the access network has that amount of bandwidth available to the user.

None of the prior proposals for personalised content delivery has disclosed a mechanism for personalising quality of content delivery when the content is to be delivered from a cache. Since both caching and personalisation of quality of delivery are beneficial, there is a need to provide such a mechanism.

According to one aspect of the present invention, there is provided a method of operating a communications network comprising a remote network in communication with a local network, said method comprising:

transmitting content delivery policy data from said remote network to said local network, said content delivery policy data being analysable to find content delivery parameters given at least one communication attribute;

operating said local network to:

store said content delivery policy data at said local network;

receive a communication attribute for the delivery of content data to a recipient;

analyse said content delivery policy data to find content delivery parameters for said content data delivery; and deliver said content data to said recipient in accordance with said parameters for said delivery;

wherein:

said local network further comprises a local content data store arranged to store said content data; and said content data delivery step comprises delivering said content data from said local store over said local network with one of a plurality of qualities of delivery selected in accordance with said parameters.

The plurality of qualities of delivery might be two or more classes of delivery service, or might be a range of bandwidths, delays, amounts of jitter etc.

In this specification 'personalised content provision' and equivalent expressions cover both the personalisation of a content file and the personalisation of network service when delivering a content file.

According to a first aspect of the present invention there is provided a method of operating a communications network comprising a remote network in communication with a local network, said method comprising:

transmitting content provision policy data from said remote network to said local network, said content provision policy data being analysable to find content provision adaptation parameters given at least one communication attribute;

operating said local network to:

store said content provision policy data at said local network;

receive a communication attribute for the provision of a content file to a recipient;

analyse said content provision policy data to find content provision adaptation parameters for said content file provision; and provide said content file to said recipient in accordance with said parameters for said provision.

By transmitting content provision policy data (which might, for example, be generated by a content provider at a remote network) to a local network, said data being analysable to find content provision adaptation parameters given at least one communication attribute, receiving a communication attribute for the provision of a content file to a recipient and then analysing said data to find said content provision adaptation parameters for said provision, a local network operator is able to provide personalised content delivery to said recipient in accordance with one or more content provision policies of, for example, said content provider. Furthermore, by carrying the analysis of the content provision policy data at the local network, the personalisation processing load on said remote network is reduced. Communication attributes might include attributes of the content file to be provided and/or recipient attributes. Recipient attributes might include attributes of the network facilities used to provide communication with the user (including the type of receiver used by the user) as well as characteristics of the user himself.

In the preferred embodiment described below the content provision adaptation parameters comprise a destination port/source port pair and a Diff-Serv marking to be applied to packets flowing between those ports. However, in a second embodiment they comprise a 'bid' which is convertible into Diff-Serv marking and source/destination port pair in dependence on the current price of bandwidth in the local network. The expression content provision adaptation parameters is also intended to cover any other parameters that are convertible to such a packet-marking policy.

Preferably, said communication attribute comprises one or more recipient attributes, said method further comprising the steps of operating said remote network to:
a) store data listing one or more recipient attributes for each of a plurality of first recipient identifiers;
b) receive an recipient attributes request message including an indication of a first recipient identifier;
c) responsive to said recipient attributes request message, sending a recipient attributes reply message containing said recipient attributes associated in said stored data with said first recipient identifier to said local network.

This provides a mechanism for using a database stored at the remote network to generate one or more recipient attributes corresponding to a recipient identifier (e.g. a user name). This has the advantage that the operator of that database (which might, for example, be a content provider) can cause information they hold about the recipient to be taken into account when deciding how to provide the content file over the local network to the user.

Preferably, said recipient attributes request message further comprises a recipient network address;
said recipient attributes reply message further comprises said recipient network address;
said method further comprises the step of operating said local network to store said recipient attributes in association with said recipient network address for a predetermined period of time;
said content file provision step comprises:
receiving a content file request, said content file request including a recipient network address;
finding the recipient attributes associated with said network address; and
providing said content file over said network in accordance with said recipient attributes.

This has the advantage that the recipient need not provide the local network with a user identifier.

Preferably, said predetermined period of time extends for one user session with the remote network. Note that the IP address changes between user sessions with the local network. A user session with the remote network normally forms part of a user session with the local network. Such embodiments of the invention have the advantage that the personalised content provision can adapt between user sessions with the remote network.

Preferably, said content provision policy data comprises a plurality of subsets of content provision policy data, each subset relating to a predetermined class of content file;
said method further comprising:
receiving a request that a content file be provided to a user, said request including a name for said content file;
classifying said content file as belonging to a predetermined content class based on said name; and
said content provision policy data analysis step comprises:
selecting a subset of said content provision policy data which corresponds to said content class; and
analysing said subset to find content provision adaptation parameters for said provision.

This allows for more flexible personalisation which takes into account both the nature of the content file to be provided and the recipient attributes.

In some embodiments, each first recipient identifier comprises a user name, said recipient attributes comprise one or more user attributes, and said content file provision step comprises providing, in accordance with said user attributes, said file to a user associated with said first recipient identifier. In these cases, personalised content provision depends on the user, rather than, say, the physical characteristics of parts or the whole of the local network over which the file is to be delivered.

In some embodiments, said local network further comprises a local content file store and said method further comprises:
operating said local network to store said content file at said local content file store, said content file provision step comprising delivering said content file from said local store over said local network with a quality of network service in accordance with said recipient attributes.

In this case, it is the quality of the delivery of the file by the local network that is personalised. In other cases, it is the content itself which is personalised.

BRIEF DESCRIPTION OF THE DRAWINGS

By way of example only, specific embodiments of the present invention will now be described with reference to the accompanying Figures in which.

DETAILED DESCRIPTION OF EXEMPLARY EMBODIMENTS

Figure 1:
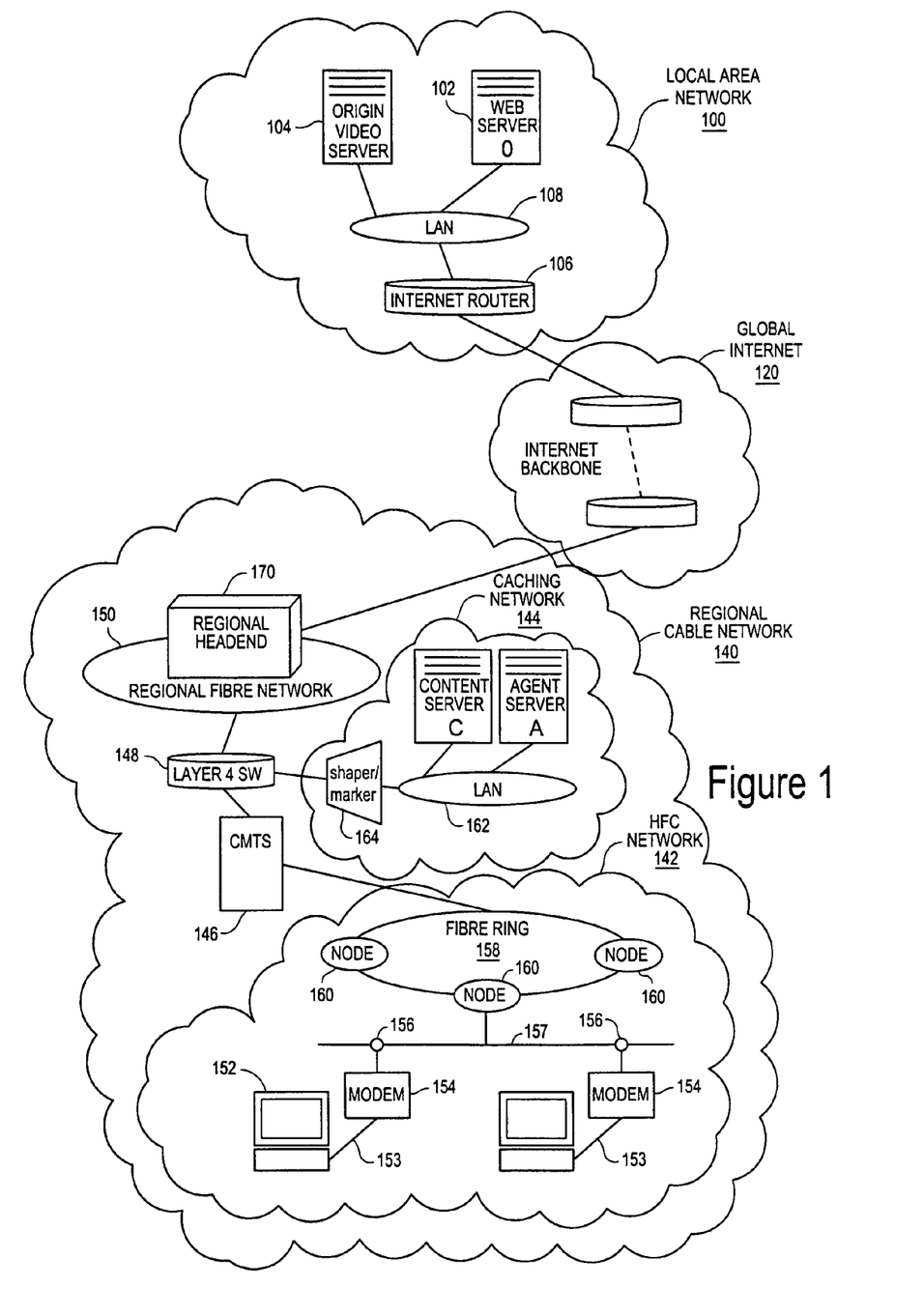
FIG. 1 shows an internetwork in which a first embodiment of the present invention is implemented.

FIG. 1 shows an internetwork comprising a content provider's local area network 100, a regional cable network 140 and a portion of the global Internet 120 which interconnects them.

The content provider's network 100 comprises a content provider's Web server 102 and origin video server 104, an Internet router 106 and a LAN 108 interconnecting them.

The regional cable network 140 comprises a hybrid fibre/co-axial (HFC) cable network 142, a regional headend 170 which connects the regional cable network to the global Internet 120, a regional fibre network 150, a caching network 144, a Layer 4 switch 148 and a Cable Modem Termination System (CMTS) 146 which interconnects the Layer 4 switch 148 and the HFC cable network 142. The Layer 4 switch interconnects the regional fibre network 150, the caching network 144, and the CMTS 146. A suitable CMTS is the Cisco uBR 7246 which operates in accordance with a pre-standard version of the DOCSIS (Data Over Cable Service Interface Specification) standard version 1.1. The Cisco uBR 7246 also schedules IP packets which transit it in accordance with the value of the so-called Differentiated Services (DS) field in the IP packet header (see the Internet Engineering Task Force's Request For Comments (RFCs) 2474 and RFC 2475 for details of the DS field).

The HFC network 142 comprises a large number of sets of user equipment (152-156), a plurality of co-axial cable networks 157 serving around 700 homes each, a fibre ring 158, and a number of fibre nodes 160, each of which connects the fibre ring 158 to one of the co-axial cable rings 157. Each set of user equipment (152-156) comprises a Toshiba PCX 1100 cable modem 154 (a pre-standard DOCSIS 1.1-compliant cable modem), a Personal Computer (PC) 152, a cable 153 leading from the modem 154 to the PC 152, a cable 155 extending from each set of user equipment to a tap 156 on the co-axial cable ring 157.

The caching local area network 144 comprises an agent server A, a content file caching server C, a shaper/marker 164 and a Local Area Network 162 which interconnects them. The Local Area Network 162 operates in accordance with the Institute of Electrical and Electronics Engineers (IEEE) 802.3 standard at a rate of 100 Mbits$^{-1}$. The 155 Mbits$^{-1}$ Lucent Access Point 1000 (AP1000) supplied by Lucent Technologies Inc., 600 Mountain Avenue, Murray Hill, N.J., USA would provide a suitable shaper/marker ability.

In accordance with a first embodiment of the present invention, the CMTS 146 is configured as follows. Three diff-serv codepoints (say 111000, 110000, and 000000) are chosen to represent top-priority traffic, mid-priority traffic and best effort traffic respectively. The CMTS/IP Router is able to offer each type of traffic simple priority over traffic of the next lowest level of priority.

The IP router component of the headend 170 is configured to reset (to 000000) the DS fields of packets arriving over the Internet link 9 which have their DS field set to a value which is equated to any other priority level than best effort.

The agent server computer A is provided with a HyperText Transfer Protocol client program which is configured to use the caching server computer C as a proxy (in other words, HTTP requests from the agent server computer will be received by the caching server computer C and forwarded if the caching server computer itself cannot satisfy the request. HTTP responses to those requests will be received by the caching server computer and forwarded to the agent server computer A).

The content provider's Web server computer 102 is provided with a content classifier program, a web server program, and a quality of service (QoS) policy generation program.

The web server program controls the Web server computer 102 send web-pages requested by a user to that user and to gather information about users in order to enable personalisation of the user's service. In the present embodiment, this is achieved by asking users to fill in a HyperText Mark Up Language (HTML) form in order to register with the website. The form asks the user for a user name and password and various other data such as the user's age, gender, nationality and occupation category. The information from all registered users is stored as a database at the Web server computer 102, the database comprising a number of user records, each being of the form shown in FIG. 2. Those skilled in the art would be able to write a suitable Web server program.

When run, the QoS policy file generation program controls the Web server computer 102 to prompt the content provider to indicate one or more conditions involving content class and user attributes, and a class of service to be provided if that condition is satisfied. As the user enters the conditions, the program controls the computer to provide the content provider with a graphical user interface similar to that shown in FIG. 3. Those skilled in the art will have no difficulty in creating such a program.

In a configuration phase, the content classifier program controls the computer to prompt the user to enter rules for classifying each content file stored on the origin video server 104 into a content class given the Universal Resource Locator. For example, all Real™ video files in the directory named 'latest' could be placed in the content class 'latest_release_videos'. The mapping from the URL to the content class in that case might be represented as:

Rstp://www.cp.com/latest/*.rm->latest_release_videos

The classification program is a Common Gateway Interface (CGI) script and is accessible via the URL http://www.cp.com/cgi_bin/classifier. The URL of the content file to be classified can be passed as a parameter of, for example, an HTTP GET request. On receiving such a request, the classification program returns an indication of the content class into which the content file is classified, together with the an indication of where the relevant qos policy for that content class is to be found. Those skilled in the art would easily be able to write a program to create a classifier operating in the above way.

The content provider also creates a QoS policy file for each content class at a URL having a predetermined relationship to its domain name—for example the content provider owning the domain name cp.com might store its QoS policy file for the content class 'latest_release_videos' at:

http://www.cp.com/gospolicy/latest_release_videos.txt

The content provider then includes the URLs pointing to its QoS policy files in the list of files which it wishes to be copied to caching servers such as caching server C in caching network 144. As will be understood by those skilled in the art, content distributors offer a service in which they copy specified files from an origin server to caches around the world. In the present embodiment, use of such a service results in the content files stored on origin video server computer 104 being copied to the caching server C, together with the content provider's QoS policy files.

Figure 4:
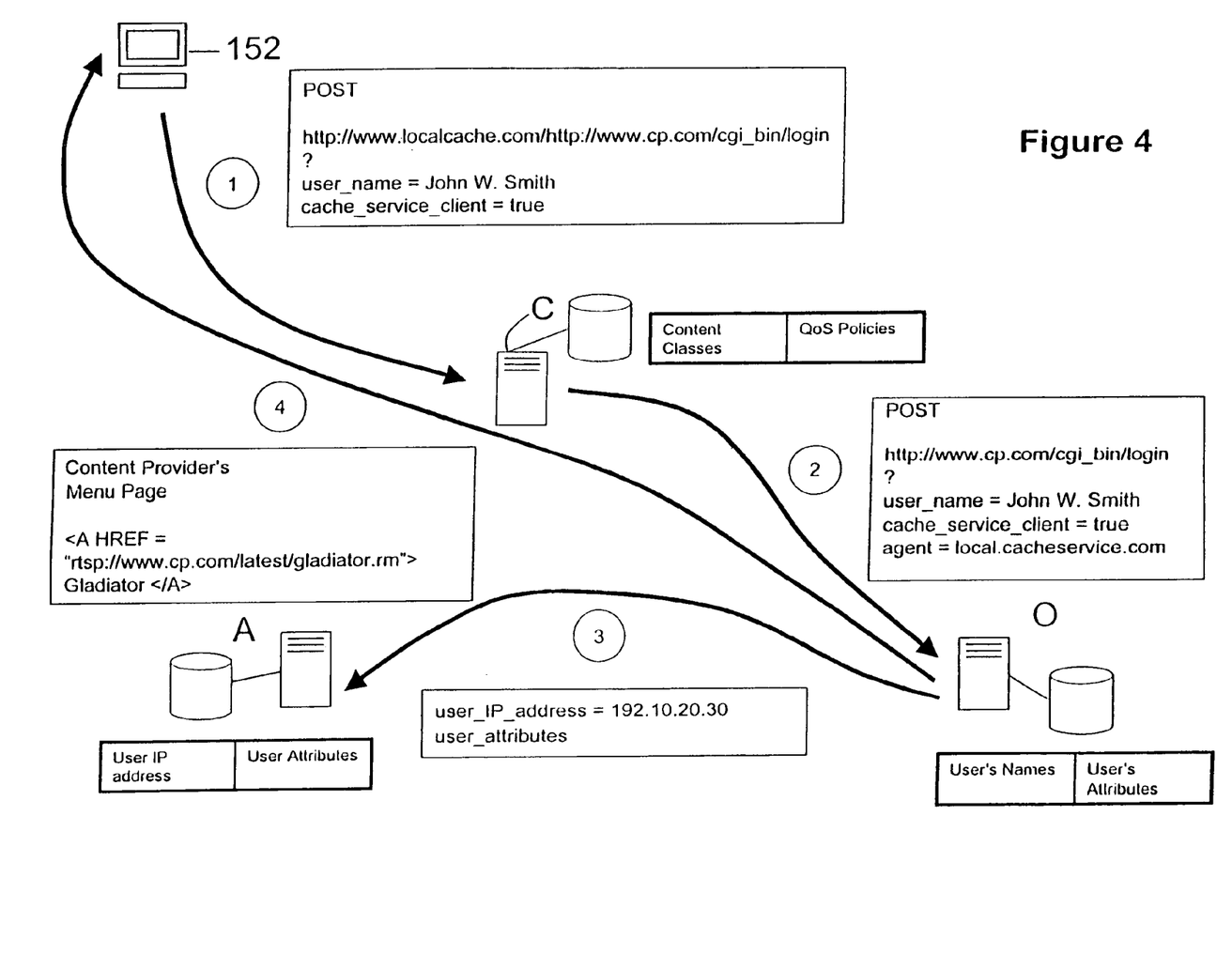
FIG. 4 shows the flow of messages between different devices of FIG. 1 in a session initiation phase of the first embodiment.
Figure 5:
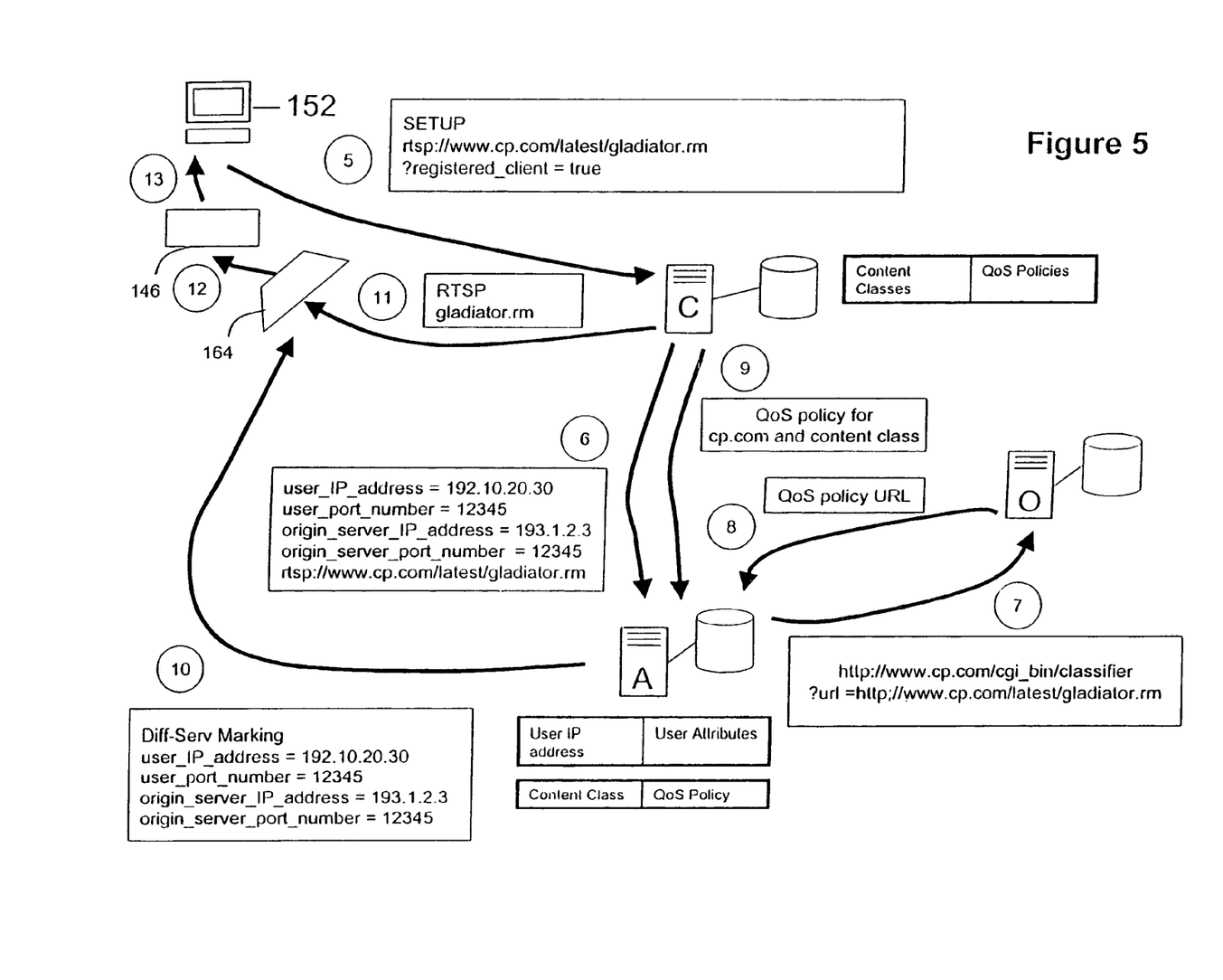
FIG. 5 shows the flow of messages between different devices of FIG. 1 in a content file request phase of the first embodiment.

FIGS. 4 and 5 illustrate the operations carried out by the customer's PC 152, the content provider's origin Web server O, agent server A and caching server C in carrying out the method of the present embodiment. In fact, the steps of FIGS. 5 and 6 carried out by the personal computer 152 are carried out under the control of a conventional browser program such as Netscape's Navigator version 4.

FIG. 4 shows the steps involved when a previously registered user at PC 152 browses the home page of the content provider. The home page includes a form as provided for by HyperText Mark Up Languages HTML 2.0 and above. As will be understood by those skilled in the art, the form as presented to the user has text fields into which the user must enter his user name, and a submit button. The HTML file representing the web-page will also contain a URL which points to a Common Gateway Interface script (i.e. an executable program) and a further indication parameter not displayed to the user that indicates the web-page has been generated for a registered client of the caching server operator. When the user clicks on the submit button, the browser program running on the PC 152 sets up a Transmission Control Protocol (TCP) connection to the Layer 4 switch and sends a HyperText Transfer Protocol (HTTP) POST request across that TCP connection (step 1). The layer 4 switch is configured to redirect all requests destined for the default ports used for each content file type to the cache (e.g. port 80 for http and port 554 for rtsp). This avoids the browser program stored on the PC 152 having to be configured to point to the cache. The POST request is accompanied by the user name and the indication parameter and implicitly contains the client IP address. The Layer 4 switch recognises the TCP port value in the POST request and hence forwards the request to the caching server C. The plug-in program on the caching server C recognises that the request must be forwarded to the origin server and, since the indication parameter is present (the indication being the indication cache_service_client=true which forms part of the Universal Resource Locator (URL) in the original POST request), appends an indication of the agent server A and the client IP address and then sets up a further TCP connection to the origin Web server O and passes the modified POST message across that connection (step 2).

The origin Web server O receives the POST message and the appended user name, client indication, client IP address and agent identifier. In response, it runs the associated CGI script which causes it to:
a) fetch from the user database the user record (FIG. 2) corresponding to the user name received in the incoming message, and then send that user record and an indication of the user's current Internet address and a locally-generated unique identifier (nonce) to the agent identified by the agent identifier in the received message (step 3); and
b) send an HTML file representing a registered user menu page to the PC 152 (step 4). The HTML file includes one or more hyperlinks to content files previously copied to the caching server C by a content distributor as described above. These links incorporate the nonce in the URL. The nonce can therefore serve as a differentiator between multiple users with the same IP address (which may arise from use of a NAT gateway, or a multi-user client host). It can also be used to detect attempts by clients to masquerade using another client's IP address.

On receiving the user record message, the agent server A stores the user record along with the user's current IP address and nonce.

Once it is received, the user's PC 152 presents the HTML file as a registered user menu page on the screen of the PC 152. The registered user menu page includes one or more hyperlinks which are associated with content files stored on the caching server C.

Turning now to FIG. 5, on the user selecting one of those hyperlinks an RTSP SETUP request is sent to the Layer 4 switch 148. As before, the HTML file includes a HTML form which causes a further registered client indication to be included in the SETUP request. The Layer 4 switch 148 recognises the TCP port in the request and hence forwards the request to the caching server C (step 5). On receiving the SETUP request, the plug-in program at the caching server C responds to the presence of the further registered client indication by controlling the caching server to send a content file transfer parameters message to the agent server which includes the URL of the requested content file (which includes the nonce), values of the user's TCP port and IP address, and the origin server's TCP port and IP address (step 6).

On receiving the content file transfer parameters message for receiving the requested content file, the agent sends an HTTP GET request to the classifier program at the Web server 102 having the URL as a parameter (step 7). The classifier program controls the Web server 102 to respond by giving the URL of the relevant QoS policy (step 8). Since the URL of the QoS policy file is returned as an embedded object, the HTTP client at the agent is automatically re-directed to fetch the QoS policy file. The agent computer then retrieves the QoS policy file (FIG. 3) previously stored at the cache by the content distributor (step 9). The agent stores the QoS policy file.

The agent server A then looks up the stored user record (which it received in step 3) associated with the IP address and nonce received in the content file transfer parameters message.

It should be noted that the user authentication process described above is used for controlling access to QoS delivery of the requested content, which is distinct from controlling access to the content itself. The caching server may consult the origin server to verify that access to content by a particular user is to be allowed at all.

Figure 6:
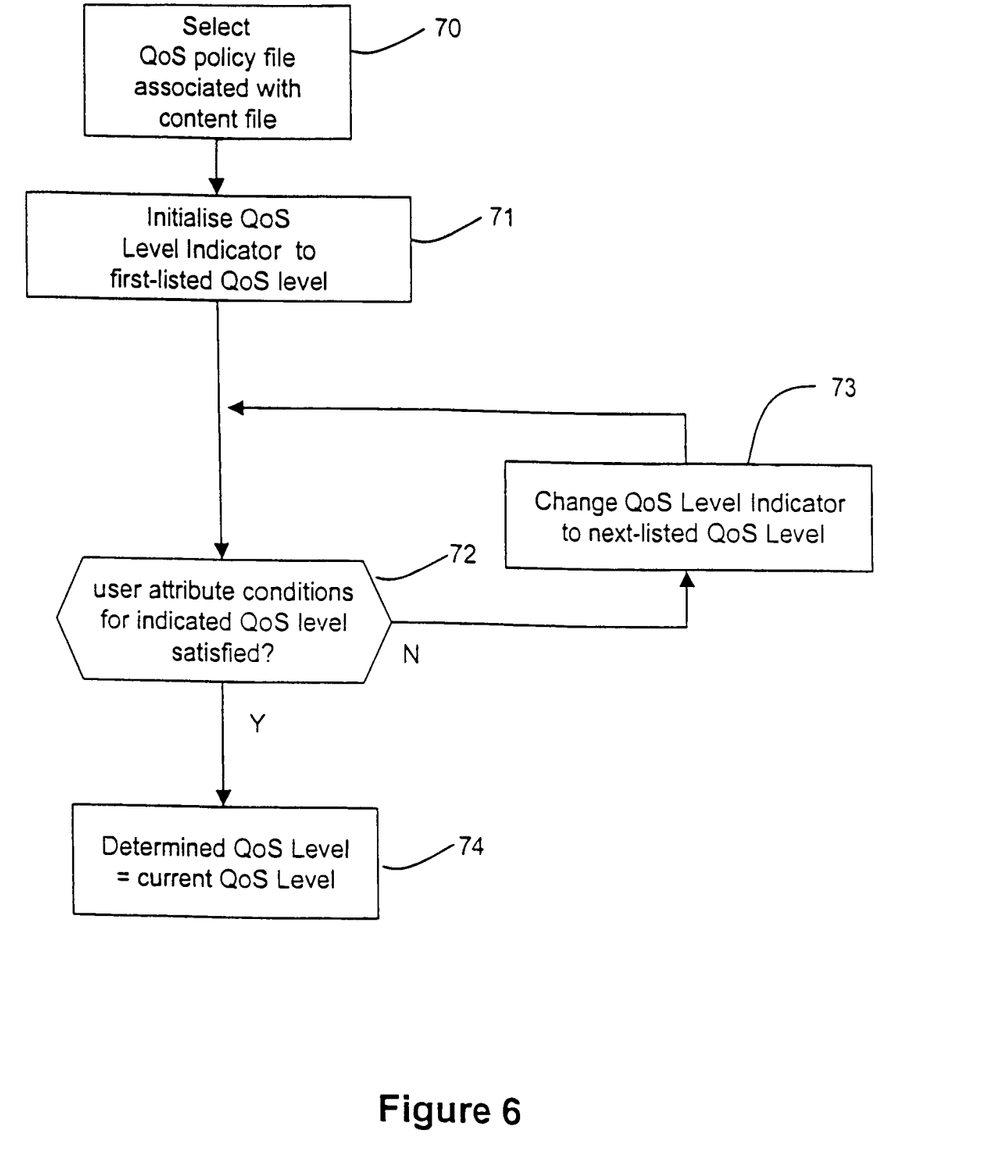
FIG. 6 shows the operation of the agent server of FIG. 1 in deducing a Diff-Serv codepoint for a given content file transfer.

The agent server A then processes the user record, and QoS policy file as illustrated in FIG. 6.

In a first step the program controls the agent server A to select (step 70) the QoS policy file previously received (FIG. 5: step 9). For example, the QoS policy file illustrated in FIG. 3 might be used.

Figure 3:
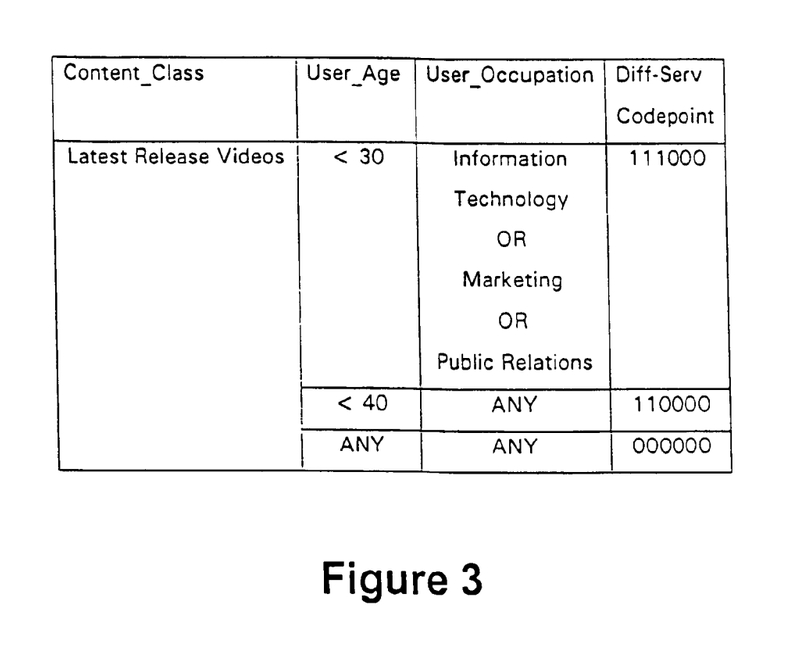
FIG. 3 shows a Quality of Service policy record stored at the caching server of FIG. 1.

Then, in step 71, the program initialises a QoS level indicator to a value that points to the first-listed QoS level (i.e. right-hand column of FIG. 3). In the present example, that QoS level results from packets being given a Diff-Serv codepoint 111000 which equates to the highest priority that might be given to packets delivered from the cache.

In step 72, the program tests whether the user attribute conditions associated with that QoS level are satisfied. If they are not, the program changes the QoS Level Counter to indicate the next-listed QoS level (step 73) and the conditions for that quality of service level are tested. If the conditions are met then the QoS level for the current content file transfer has been found and an indication of that QoS level is stored (step 74).

Figure 2:
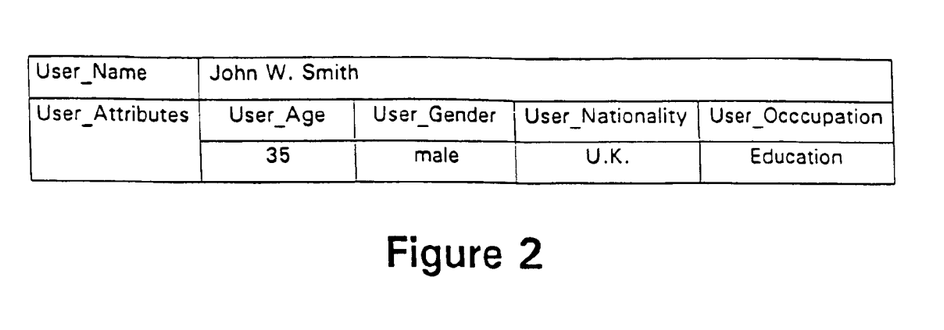
FIG. 2 shows a user record stored at the origin Web server of FIG. 1.

Using the user attributes of FIG. 2 as an example, it will be seen that when the conditions for applying diff-serv codepoint 111000 are tested, the condition (age<30) is not satisfied. Hence, In the present example, the conditions for the next-listed QoS level (for which a diff-serv codepoint of 110000 would be applied) are tested. In that case the age condition and the user occupation conditions are met and the agent server determines that the file rtsp://www.cp.com/latest/gladiator.rm should be transferred to user John W. Smith in packets marked with the diff-serv codepoint 110000.

Returning now to FIG. 5, having made the determination as to the QoS level to be applied to the content file transfer to the requesting user, the agent server sends (step 10) a message indicating the source and destination IP addresses and TCP ports of the content file transfer and the Diff-Serv marking associated with the QoS level stored in step 74 to the marker 164.

In the meantime, the caching server C sets up a streaming session with the user's PC 152. The caching server divides the content file into packets and starts sending (step 11) those packets to the user's PC 152 via the marker 164. Once the marker 164 has received the Diff-Serv marking message from the agent server A, it recognises packets belonging to the content file transfer (the IP address and User Datagram Protocol (UDP) port in the marking instruction will match the corresponding parameters in packets belonging to the content file transfer—note that, since it is operating as a transparent cache, the caching server operates to use the origin server's address as the source address of the packets). The marker marks packets so recognised with a Diff-Serv codepoint that corresponds to the Diff-Serv codepoint indicated in that instruction. In the present example, that Diff-Serv marking indicates that the packets of the content file transfer are to be marked as having medium priority.

The marked packets are forwarded to the CMTS 146 which will schedule the packets sent from it in accordance with the diff-serv codepoints they contain. In the present example, if any flows having a high priority diff-serv codepoint are being queued for entry onto the fibre ring 158 then those packets will be sent before packets belonging to the content file transfer to John W. Smith are sent.

It will be seen how the present embodiment reduces the processing that needs to be carried out by a content provider at the remote network in order to provide a personalised quality of delivery service.

Figure 7:
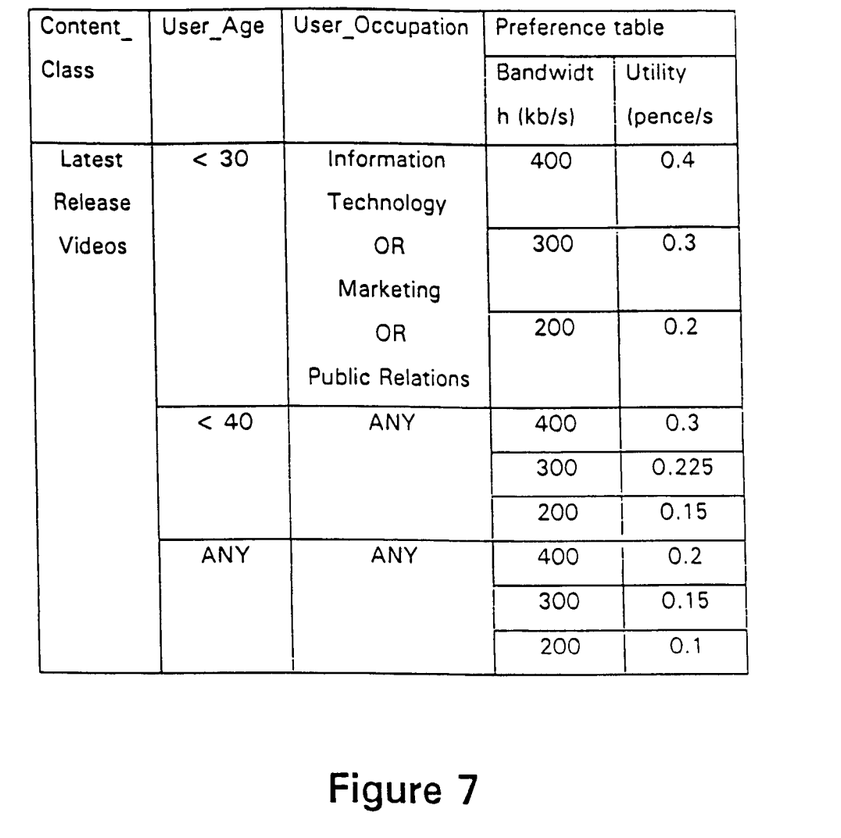
FIG. 7 shows a Quality of Service policy record stored at the caching server of FIG. 1 in a second embodiment of the present invention.
Figure 8:
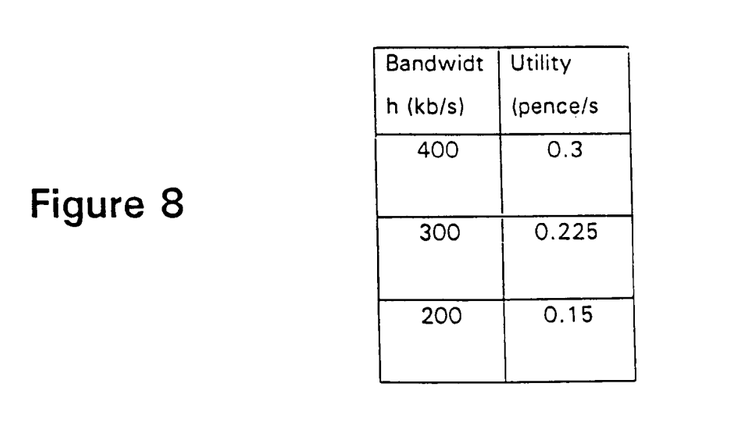
FIG. 8 shows a bid record sent by the agent server of FIG. 1 in the second embodiment.

A number of alterations can be made to the above described embodiment without departing from the scope of the present invention. Such alterations include:

i) although the above embodiment describes the transfer of video files, it is, of course applicable to any type of file—including software files for example;

ii) there is no requirement that the local access network be provided by a cable network. Alternative embodiments could use Asymmetric Digital Subscriber Link (ADSL) modems over copper pairs or a wireless local loop access network. A third alternative access network technology is a broadband wireless access network using wideband code division multiple access technology complying with the Universal Terrestrial Radio Access (UTRA) specifications published by the Third Generation Partnership Project (3GPP). In this case, the modem in FIG. 1 would specifically be the mobile termination module in the mobile equipment, and the function of the CMTS 146 would be performed by a base station or access router. Embodiments might involve mobile networks operating in accordance with the Universal Mobile Telecommunications System UMTS. In that case, an access router might play implement IP QOS shaping over the access network.

iii) in the above embodiment, packets with one diff-serv marking are given simple priority over packets with other diff-serv markings. In alternative embodiments, different diff-serv markings could be given different allocations from the output capacity of the CMTS 146.

iv) Although the agent server, packet shaper, and caching server are run on different computers in the above embodiment, two or more of those processes could be run on a single computer. Also, there may be more than one caching server or agent server per packet shaper. A single agent server could serve a large number of caching servers.

v) In other embodiments, the QoS policy file could provide a plurality of 'bids' for Quality of Service from the local network. An example of such a QoS policy file is shown in FIG. 7. It will be seen that three bandwidth/utility value pairs replace each of the Diff-Serv codepoints seen in FIG. 3 (utility here means the amount the content provider is willing to pay to receive the corresponding bandwidth). Each group of three bandwidth/utility pairs is known as a 'bid'. In these embodiments a bandwidth broker computer is added to the local area network 144 of FIG. 1. One of the bids is selected by the agent server computer A in the same way that a Diff-Serv marking was selected in the first embodiment. The bid in the example is shown in FIG. 8; The bid is then passed to the bandwidth broker computer which selects one of the three bandwidths in dependence on the prices offered for the three bandwidths by the local network and the content provider's utility values for those bandwidths. The bandwidth broker then goes on to send a message to the packet marker 164 that indicates that packets of the identified flow are to be marked with a Diff-Serv codepoint that results in packets within the flow being shaped to the selected bandwidth. Note that the bandwidth broker computer and packet shaper might be operated by a different provider (e.g. access provider) from the network provider (e.g. Internet Service Provider) operating the cache C and the agent server computer A. Subject to these enterprise considerations, the bandwidth broker function may be implemented on the same computer as one or more of the packet shaper, agent and cache.

vi) Although the above embodiment relates to personalised Quality of Service provision, the techniques of the above embodiment could equally apply to personalised content generation—in that case the content itself could be altered by the agent server prior to its delivery to the user. Personalisation might, for example, be applied to the selection of alternative content files for delivery, selection of component content files for assembly into a single presentation, and transformation of the content files themselves).

vii) In the above-described embodiment different QoS policy files were provided for different classes of content files. One of the QoS policy files was selected in dependence on the class of the requested content file, and then a Diff-Serv marking was selected from the selected QoS policy files on the basis of one or more recipient attributes. In alternative embodiments, QoS policy files could be stored for different classes of user, a QoS policy file might then be selected in dependence on the class of the user making the request, and a Diff-Serv marking could be selected from the selected QoS policy file on the basis of one or more content file attributes. In either case, some of the processing necessary to find a Diff-Serv marking for the provision of a given content file to a given user is done at the local network, thereby reducing the personalisation processing load placed on the remote network.

viii) In the above embodiment a plug-in program is installed on the caching server computer C which identifies HTTP requests which should be forwarded to the origin server computer O. In alternative embodiments the plug-in program could be installed on a proxy server located between the client and the cache.

ix) Instead of marking traffic on the traffic shaper and operating static shaping rules on the CMTS (access server), dynamic shaping rules may be setup directly on the CMTS.

x) Instead of a cache, a local content server may be used. In this instance personalisation would be local to the content server xi) A cookie may be used as the user identifier in the identification step.

xii) The user attributes message from the origin server to the agent may be returned via the cache, with the plug-in filtering responses from the origin server to make sure that such messages are forwarded to the agent.

What is claimed is:

1. A method of operating a communications network comprising a remote network in communication with a local network, said method comprising:

transmitting quality of service policy data from said remote network to said local network, said quality of service policy data providing quality of service parameters corresponding to at least one attribute for future communication of content data to a recipient wherein said at least one attribute comprises an identifier of a recipient or at least one attribute of a recipient;

operating said local network to:
(i) store said quality of service policy data at said local network;
(ii) receive from said remote network said at least one identifier of a recipient or at least one attribute of a recipient for the delivery of content data to the recipient;
(iii) using said received attribute to analyze said locally stored quality of service policy data to find quality of service parameters for said content data delivery; and
(iv) deliver said received content data to said recipient in accordance with said quality of service parameters;
wherein:
said local network further comprises a local content data store arranged to store said content data; and
said content data delivery step (iv) comprises delivering said content data from said local store over said local network with one of a plurality of classes of service selected in accordance with said quality of service parameters.

2. A method according to claim 1 wherein said attribute comprises one or more attributes of a recipient said method further comprising operating said remote network to:
a) store data listing one or more attributes of recipients for each of a plurality of first identifiers of recipients;
b) receive an attributes request message including an indication of a first identifier of recipients;
c) responsive to said attributes request message, sending an attributes reply message containing said attributes associated in said stored data with said first identifier to said local network.

3. A method according to claim 2 wherein:
said attributes request message further comprises a recipient network address;
said attributes reply message further comprises said recipient network address;
said method further comprises operating said local network to store said attributes in association with said recipient network address for a predetermined period of time;
said content data delivery step comprises:
receiving a content data request, said content data request including a recipient network address;
finding the attributes associated with said network address; and
providing said content data over said network in accordance with said attributes.

4. A method according to claim 3 wherein said predetermined period of time extends for one user session with said remote network.

5. A method according to claim 1 wherein said quality of service policy data comprises a plurality of subsets of quality of service policy data, each subset relating to a predetermined class of content data, said method further comprising:
receiving a request that content data be provided to a user, said request including a content data identifier;
classifying said content data as belonging to a predetermined content class based on said content data identifier; and
said quality of service policy data analysis includes selecting a subset of said quality of service policy data which corresponds to said content class and analyzing said subset.

6. A method according to claim 1 in which each first identifier comprises a user name, said attributes comprise one or more user attributes, and said content data delivery step comprises providing, in accordance with said user attributes, said data to a user associated with said first identifier.

7. A method according to claim 1 wherein said method further comprises operating said local network to carry out a bidding process by converting a content provision or adaptation attribute received from the remote network into one of plural delivery bandwidth in dependence upon a current price of bandwidth in said local network.

8. A method of operating a communications network comprising a remote network in communication with a local network, said method comprising:
transmitting quality of service policy data from said remote network to said local network, said quality of service policy data providing quality of service adaptation parameters corresponding to at least one attribute for future communication of content data to a recipient wherein said at least one attribute comprises an identifier of a recipient or at least one attribute of a recipient;
operating said local network to:
(i) store said quality of service policy data at said local network;
(ii) receive from said remote network said at least one identifier of a recipient or at least one attribute of a recipient for the provision of content data to the recipient;
(iii) analyze said locally stored quality of service policy data to find quality of service adaptation parameters for said content data provision; and
(iv) provide said content data to said recipient in accordance with said quality of service adaptation parameters;
wherein said content data provision step (iv) comprises generating said content data in accordance with said at least one identifier of a recipient or at east one attribute of a recipient.

9. A communications network comprising a remote network in communication with a local network, said network comprising:
policy transmission means arranged in operation to transmit quality of service policy data from said remote network to said local network, said quality of service policy data providing quality of service parameters corresponding to at least one attribute for future communication of content data to a recipient wherein said at least on attribute comprises an identifier of a recipient or at least one attribute a recipient;
said local network being arranged in operation to:
(i) store said quality of service policy data at said local network;
(ii) receive from said remote network said at least one identifier of a recipient or at least one attribute of a recipient for the delivery of content data to a recipient;
(iii) using said received attribute to analyze said quality of service policy data to find quality of service parameters for said content data delivery; and
(iv) deliver said content data to said recipient in accordance with said quality of service parameters;
wherein:
said local network further comprises a local content data store arranged to store said content data; and
said local network is further arranged in operation to deliver said content data to said recipient by delivering said content data from said local store over said local network with one of a plurality of qualities of delivery selected in accordance with said parameters.

10. A communication network according to claim 9 wherein said local network comprises a datagram network.

11. A communication network according to claim 10 wherein said datagram network comprises:
- datagram marking means arranged in operation to mark datagrams addressed to a recipient's network address in accordance with said parameters for a delivery to said network address; and
- datagram scheduling means arranged in operation to receive datagrams marked by said datagram marking means and to forward them in a manner dependent on said marking, thereby to cause the quality of said delivery to be in accordance with said parameters.

12. A communication network according to claim 10 wherein said datagram network comprises:
- datagram scheduling means arranged in operation to receive datagrams addressed to a recipient's network address and to forward them in a maimer dependent on said network address, thereby to cause the quality of said delivery to be in accordance with said parameters.

\* \* \* \* \*